United States Patent [19]

Carter

[11] Patent Number: 4,662,833

[45] Date of Patent: May 5, 1987

[54] VENTING UNIT FOR A RUBBER ARTICLE FORMING MOLD HAVING VENTS

[75] Inventor: Russell W. Carter, Des Moines, Iowa

[73] Assignee: Corn States Metal Fabricators, Inc., Des Moines, Iowa

[21] Appl. No.: 732,049

[22] Filed: May 9, 1985

[51] Int. Cl.$^4$ .............................................. B29C 35/02
[52] U.S. Cl. .................................. 425/28 R; 249/141; 425/812
[58] Field of Search ...................... 425/28 R, 812, 504

[56] References Cited

U.S. PATENT DOCUMENTS

| | | | |
|---|---|---|---|
| 1,746,107 | 2/1930 | De Mattia | 425/28 R |
| 3,891,363 | 6/1975 | Sievers et al. | 425/28 R |
| 4,436,497 | 3/1984 | Dahl et al. | 425/812 |
| 4,447,197 | 5/1984 | Bartley et al. | 425/28 R |

FOREIGN PATENT DOCUMENTS

| | | | |
|---|---|---|---|
| 2246948 | 4/1974 | Fed. Rep. of Germany | 425/812 |
| 1117281 | 6/1968 | United Kingdom | 425/812 |

Primary Examiner—Willard E. Hoag
Attorney, Agent, or Firm—Rudolph L. Lowell

[57] ABSTRACT

A venting unit is inserted in a press fit within the air vent of a rubber article forming mold and is comprised of a cylindrical body member with an axial bore having a reduced outer end section with an air inlet open to the mold cavity. The junction of the reduced outer end section with the main section of the bore is defined by a shoulder that provides a rubber severing member. Any uncured rubber which, during expansion of the rubber article to its final form that may be compressed into the reduced section expands on entering the main bore section and is severed at the shoulder on removal of the formed article from the mold cavity. The diameter of the reduced bore section relative to its axial length provides for the unexpanded rubber that adheres to the removed article being of a relatively minute size so as to form with the exterior surface of the article a substantially smooth and continuous surface.

3 Claims, 5 Drawing Figures

VENTING UNIT FOR A RUBBER ARTICLE FORMING MOLD HAVING VENTS

BACKGROUND OF THE INVENTION

In the forming of vehicle tires, it is desirable that the tire side wall be free of any radially projected rubber pins, impressions, depressions or other surface irregularities. The forming of the pins or needles is usually the result of the uncured tire band, in the final forming operation of the tire, being forced into the air release vents or passages which have terminal ends open to the inner surface of the tire forming cavity of the mold. For economical purposes, the pins are not removed and thus give to the tire an unfinished or hairy appearance.

Attempts to avoid surface irregularities on the tire side wall have been made particularly with regard to avoiding the necessity and resultant expense of removing the rubber pins from the finished tire. One attempt to eliminate the rubber pins is shown in British Pat. No. 922,788, issued Apr. 3, 1963, wherein a valve body is movably mounted in a vent for movement to a vent closing position by the expanding of the tire band against the cavity side wall. The valve is not movable to a full open position and is apparently limited in operation for use in horizontally extended vents so that the depression made by the valve is formed in the tread of the tire so as to appear as part of the tread.

In U.S. Pat. No. 4,021,168, bent nails having one or more washers positioned between the nail head and the face of the mold are inserted into the vents or passages of the tire mold. The uncured rubber is prevented from forming in the vents during a molding operation and air is permitted to escape. However, the nail head and washer assembly form depressions over the entire tread and tire side wall surface.

In U.S. Pat. No. 3,377,662, a plug means is inserted within an air vent with the plug having a plurality of small vent holes so that any rubber protruded in the air vent would not generate undesirable projections on the finished surface of the tire. Additionally, the plug means is adapted to be removed from an air vent for cleaning purposes.

In U.S. Pat. No. 3,842,150, the release of air from the mold cavity through vents is controlled by valves that are actuated in response to a selective application of pressure thereon. Although the control valve functions satisfactorily to form a tire having a smooth side wall, appreciable time and resultant expense is involved in the manufacture of the control valves and in the control system for synchronizing the flow of variable pressure air through the valves with the steps in the tire forming operation. The valve unit for the tire mold in U.S. Pat. No. 4,492,554 is engaged and moved by an expanding tire band to a vent closing position to form a smooth surface continuous with the inner surface of the tire cavity and is yieldably urged to a vent opening position by a spring means. Although the valve unit of U.S. Pat. No. 4,492,554 is economically more acceptable than the valve unit of U.S. Pat. No. 3,842,150, frequent cleaning is required to insure their proper operation resulting in down time loses of the molding equipment.

SUMMARY OF THE INVENTION

The venting unit of this invention is readily applicable to present commercially available and existing tire forming machines without requiring any appreciable machining of the mold to accommodate the valve units which are inserted in a press fit within the mold cavity end of an air vent. The venting unit of this invention is economical in cost, is without any movable operating parts, and is efficient in operation over a long service life, without requiring frequent cleaning of the mold cavity or air vents or trimming of needles from the finished tire. Each venting unit is of an integral one-piece construction and consists of a cylindrical body member having an axial bore with a reduced end section having an inlet open to the mold cavity and a main section, with the junction of the two sections being defined by a rubber severing shoulder. As the tire band is expanded within the mold cavity to its final formed condition, release of air through the venting unit, some uncured rubber, may be compressed into the reduced bore section and into the main bore section where it is permitted to expand. On a removal of the formed article from the mold, the rubber projection within an air vent is severed at the shoulder therein so that the portion of the unexpanded rubber projection within the reduced bore section is removed from the mold cavity with the formed rubber article. The venting unit is of a small size with the reduced section having a diameter and an axial length of only about 0.015 inches so that the rubber portion removed with the article is relatively thin and forms with the exterior surface of the article a substantially blemish free smooth and continuous surface.

DESCRIPTION OF THE PREFERRED EMBODIMENT

Figure 1:
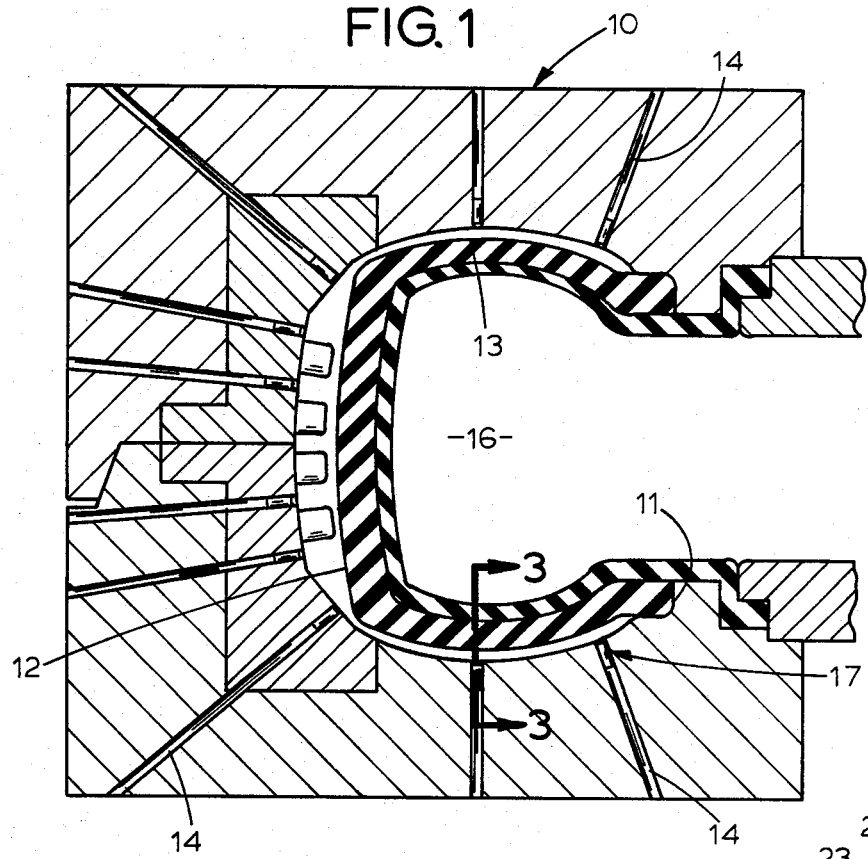
FIG. 1 is a transverse sectional view of a tire mold showing the venting units of this invention inserted in the vents thereof.

With reference to FIG. 1, there is illustrated a metal mold 10 for molding a pneumatic tire 11 having a tread portion 12 and side wall 13. The mold is of a usual two-piece construction used in a tire forming machine such as described in U.S. Pat. No. 4,492,554. The mold 10 is formed with a plurality of vents 14 each of which is open at one end to the atmosphere and at its opposite end to the mold cavity 16. The vents 14 release from the mold cavity air which would otherwise be trapped therein as the uncured rubber tire band is forced against the cavity side wall. The venting units 17 of this invention prevent excessive rubber protrusions from forming in the air vents during the molding operation. For this purpose and as shown in FIG. 1, a venting unit 17 is insertable in a press fit within the cavity end of an air vent 14.

Figure 2:
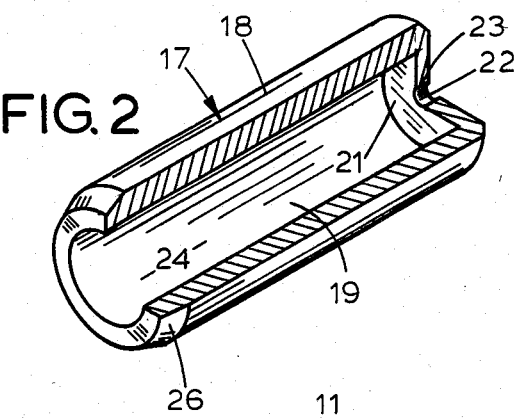
FIG. 2 is an enlarged perspective view of a venting unit with a part thereof removed to more clearly show its construction.
Figure 3:
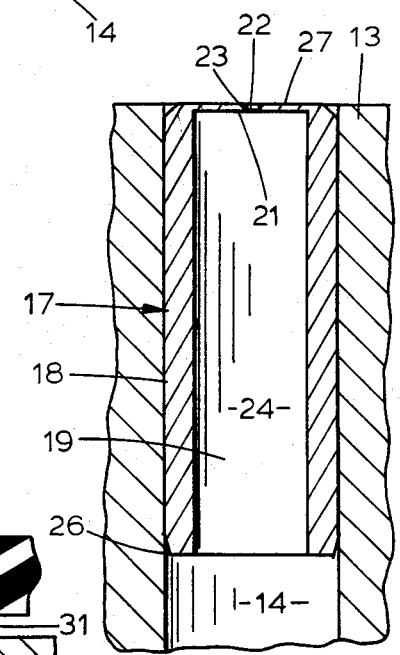
FIG. 3 is an enlarged longitudinal sectional view taken along the line 3—3 in FIG. 1.

Each venting unit 17 (FIGS. 2 and 3) consists of a cylindrical body member 18 formed with a central bore 19 having a reduced outer end section 21 with an air inlet 22 open to the cavity 16. A shoulder 23 defining the junction of the reduced inner end section of the bore 19 with the main section 24 of the bore functions as a dull knife edge or severing means for a purpose to appear later.

The outer diameter of the body member 18 is of a size relative to a vent 14 providing for its insertion in a press fit within the cavity end of the vent. The insertion is facilitated by the provision of a bevel or taper 26 formed on the inserting end of the body member 18. Each venting unit 17 is received over its full length into an associated vent 14 so that the end face or surface 27 is substantially flush or continuous with the surface of the cavity side wall 13.

Figure 4:
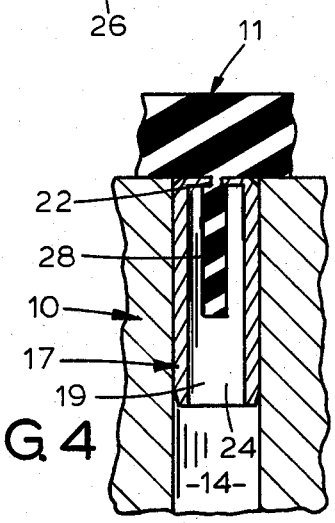
FIG. 4 is a diagrammatic illustration showing a protrusion of a needle on the exterior surface of the formed rubber article into the venting unit of the invention.
Figure 5:
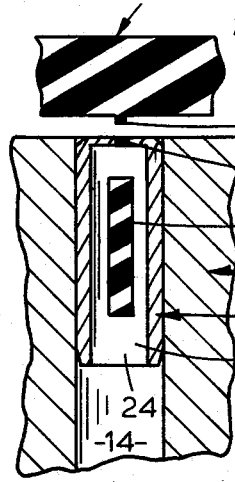
FIG. 5 is illustrated similarly to FIG. 4 and shows the severing of the needle protrusion from the article concurrently with its removal from the mold.

In use, and as illustrated in FIG. 4, as the uncured rubber of the tire 11 is expanded to its final form within the mold cavity 16, air is expelled through the bore 19. Any uncured rubber which may be protruded is initially compressed in the reduced section 21 and then expands on entering the main bore section 24. On a removal of the tire from the mold cavity 16, and as illustrated in FIG. 5, the protruded rubber needle or plug 28 is severed at the shoulder 23, with the severed portion 29 falling into the bore main section 24 and the portion 31 in the reduced bore section 21 adhering to the tire for removal with the tire from the cavity 16.

The reduced bore section 21 has a diameter of about 0.010 inches to 0.015 inches and an axial length from about 0.010 to 0.015 inches with such axial length of the shoulder 23 providing the dull knife edge at the junction of the bore sections 21 and 24. The diameter of the main bore section 24 is not less than about 0.085 inches for an outer diameter of the body member of not less than about 0.125 inches and an axial length of 0.375 inches. It is seen, therefore, that the protrusion 31 on the tire surface is relatively minute and that its projection from the tire surface is on the order of being paper thin. The tire surface thus presents a continuous and smooth appearance free of any objectionable or undesirable irregularities.

Although the invention has been described with respect to a preferred embodiment thereof, it is to be understood that it is not to be so limited since changes and modifications can be made therein which are within the full intended scope of this invention as defined by the appended claims.

I claim:

1. In a tire mold having a cavity for forming a rubber tire and having plural vents for releasing air which would otherwise be trapped in the mold cavity as the uncured rubber is expanded in the cavity to the final expanded condition therefor against the cavity side wall, the improvement comprising: a venting unit having a
    (a) a cylindrical body member received in a press fit within an air vent with the surface at the outer end thereof continuous with the surface of the cavity side wall,
    (b) said cylindrical body member defining an axially extended bore with an air inlet of a diameter reduced from the diameter of said bore, said inlet having one end open to the mold cavity and an opposite end defined by a shoulder having a configuration such as to form a rubber severing member, whereby as air is vented through said cylindrical body member, on expansion of the rubber to the final expanded condition therefor, any rubber compressed into said air inlet and into said bore expands within the bore to a diameter greater than the diameter of said air inlet so that on removal of the formed rubber tire from the mold cavity, the rubber expanded within the bore is severed at said severing member with said air inlet having a length relative to the diameter thereof such that unexpanded rubber in the air inlet removed from the mold with the formed tire is of a minute size to impart to the tire a substantially smooth and continuous exterior surface.

2. The tire mold according to claim 1, wherein:
    (a) said air inlet has an axial length of from 0.010 inches to 0.015 inches and a diameter of from 0.010 inches to 0.015 inches.

3. The tire mold according to claim 2, wherein:
    (a) said cylindrical body member has a diameter of not less than 0.125 inches and a length of not less than about 0.375 inches and said axial bore has a diameter of not less than 0.085 inches.

* * * * *